(12) United States Patent
Kitani

(10) Patent No.: US 6,735,386 B2
(45) Date of Patent: May 11, 2004

(54) FLASH CONTROL CIRCUIT

(75) Inventor: Kazunari Kitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 10/300,593

(22) Filed: Nov. 21, 2002

(65) Prior Publication Data

US 2003/0099472 A1 May 29, 2003

(30) Foreign Application Priority Data

Nov. 26, 2001 (JP) ........................................ 2001-359170

(51) Int. Cl.$^7$ ............................................. G03B 15/05
(52) U.S. Cl. ..................................................... 396/206
(58) Field of Search ................................ 396/205, 206; 315/241 P

(56) References Cited

U.S. PATENT DOCUMENTS 6,219,493 B1 * 4/2001 Aoki et al. .................. 396/206

FOREIGN PATENT DOCUMENTS

JP 2000-275704 10/2000 ........... G03B/15/05

* cited by examiner

*Primary Examiner*—W. B. Perkey
(74) *Attorney, Agent, or Firm*—Fitzpatrick, Cella, Harper & Scinto

(57) ABSTRACT

A strobe control apparatus comprises a strobe control circuit of a separately excited oscillating type, where the strobe control circuit includes a main capacitor that stores a charge for exciting a strobe, a switching device having an ON state and an OFF state, and a transformer, connected to the switching device, that generates a charging current for charging the main capacitor. The strobe control apparatus further includes a CPU that receives a first clock signal and a second clock signal different from the first clock signal, outputs a switching signal to the switching device that repeatedly switches the switching device between the ON state and the OFF state in accordance with one of the first clock signal and the second clock signal, and outputs a strobe control signal to the strobe control circuit. A first timer receives the clock signal from the first oscillator and outputs a first timer signal; a second timer receives the clock signal from the second oscillator and outputs a second timber signal, and a protection circuit switches the switching device to the OFF state in response to either the first timer signal or the second timer signal, independently of the switching signal from the CPU.

5 Claims, 5 Drawing Sheets

FLASH CONTROL CIRCUIT

BACKGROUND OF THE INVENTION

1. Field of the Invention

The present invention relates to an electronic flash device suitable for use in a camera. In particular, the present invention relates to a safety measure for a flash control circuit which excites, in a separately excited flyback manner, a transformer for use in charging a main capacitor for the flash device.

2. Description of the Related Art

In recent years, as a flash control circuit for use in a camera having a built-in flash, excited oscillation-type flyback charging circuits have been used.

A conventional flash charging circuit will be described with reference to FIG. 5. In FIG. 5, reference numeral 1 represents a battery serving as an electrical power supply, reference numeral 2 represents an oscillation transformer for boosting a flyback pulse generated in its primary coil and outputting the same to its secondary coil, reference numeral 3 represents a switching device for controlling the current flowing through the primary coil of the transformer 2, reference numeral 4 represents a resistor connected between a control electrode of the switching device 3 and GND, which resistor is provided for preventing a malfunction when no signal is fed to the switching device. Reference numeral 5 represents a diode for use in rectification, and connected in a manner such that it can rectify the output of the secondary coil of the oscillation transformer. Reference numeral 6 represents a main capacitor, reference numeral 7 represents a voltage detecting circuit for detecting a charge/voltage level across the main capacitor 6 and outputting the detection result to a controller (e.g., CPU 10), reference numeral 8 represents a light emitting unit consisting of an electric discharge tube and a trigger circuit for triggering a light emission from the electric discharge tube, and reference numeral 9 represents a power supply capacitor connected in parallel with the battery 1.

Next, a description will be given to explain a control circuit for controlling various functional portions, including a flash charging circuit, in a camera.

Referring again to FIG. 5, reference numeral 11 represents a main IC which is responsible for controlling the camera, and contains a CPU 10 for carrying out overall control. A high-speed oscillator 13 is connected to a high-speed oscillating circuit 12 provided within the main IC 11, while a low-speed oscillator 15 is connected to a low-speed oscillating circuit 14 also provided within the main IC 11. A clock signal output by the high-speed oscillating circuit provides an operation clock signal when the CPU 10 is operating normally, while a clock signal output by the low-speed oscillating circuit provides an operation clock signal when the CPU 10 is operating at low speed, and also provides a clock signal for time measurement.

In the main IC 11, an output port 19 of the CPU 10 is connected to the control terminal of the switching device 3.

Furthermore, the output of the voltage detecting circuit 7 of the flash charging circuit is input to the main IC 11 by connection to an input port 20 of the CPU 10 contained in the main IC 11.

The operation of the flash charging circuit will be described with reference to FIG. 2.

FIG. 2 is an explanatory graph showing the waveforms of various portions in the flash charging circuit shown in FIG. 5, starting from the beginning of a charging operation of the flash.

As shown in the graph, the main IC 11 starts a boosting operation from the beginning of the charging process, by switching between H and L (high and low levels) at the output port 19 of the CPU 10 at predetermined intervals thereby driving the control terminal of the switching device 3.

Whenever the output port 19 of the CPU 10 is at the H level, the control terminal of the switching device 3 is also raised to the H level, thereby turning on the switching device 3.

Once the switching device 3 is ON, a current begins to flow gradually, corresponding to the ON resistance of the switching device 3, and also to the DC resistance of the primary coil of the transformer 2.

After a predetermined time has passed and when the output port 19 is at the L level, the control terminal of the switching device 3 will also be at the L level, so that the switching device is turned off.

At this time, due to the current flowing through the primary coil of the transformer 2, a flyback pulse will occur in the secondary coil of the transformer 2. Thus, the rectification diode 5 is used to rectify the flyback pulse occurring in the secondary coil, so that a charging current will flow to the main capacitor 16, thereby increasing the charging voltage on the main capacitor 16. Then, once a predetermined time has passed, the secondary current will stop.

Thereafter, the CPU 10 again operates to set the level at the output port 19 to H, thereby repeating the charging operation.

Subsequently, the CPU 10 manipulates the voltage detecting circuit 7 to detect the charging voltage of the capacitor 16. In fact, such a detection is continued until the output of the voltage detecting circuit 7 reaches a predetermined value.

In this way, the flash charging circuit of the type using a combination of a separately excited oscillation and a flyback circuit and using the CPU or the like to properly control the switching device connected with the primary coil makes it possible to efficiently control the boosting operation in a manner such that the switching device and transistors will not cause current saturation.

For this reason, from the start of a charging operation to its end, it is possible to perform a flash charging operation with a high conversion efficiency using a substantially constant current, simply by supplying some relatively simple oscillation control signals having a constant duty and a constant frequency.

However, with regard to the above-described separately excited-type charging method, if a micro-computer malfunctions due to static electricity or the like, or if the charging voltage fails to be detected because the charging voltage detecting circuit has not been connected or becomes disconnected, a large current will continue to flow, which is undesirable.

In order to overcome the above-described drawback, Japanese Patent Laid-open No. 2000-275704 suggests preparing a CPU only for use in switching the primary coil, and another CPU serving as the main CPU for use in camera control, so as to prevent damage to the main CPU even if the CPU for controlling the primary coil in the flash is out of order.

For example, referring to FIG. 5, if the CPU is out of control while the output port 19 of the CPU is still at the H level, or if the operation of the high-speed oscillation circuit has stopped while the output port 19 of the CPU is still at the H-level, a large current will continue to flow to the primary coil of the oscillation transformer 2.

When the CPU is out of order, a commonly adopted safety measure is to reset the CPU itself by means of a watchdog timer contained in the CPU. However, it is difficult to perform such a reset operation if the oscillating circuit of the watchdog timer itself has stopped.

Namely, even from Japanese Patent Laid-open No. 2000-275704 it is understood that once the CPU for controlling the primary coil is out of order while the output port of the CPU for controlling the flash is at the H level, even if the main CPU is operating normally, it is impossible to stop the current on the primary side of the flash charging circuit.

SUMMARY OF THE INVENTION

The present invention has been accomplished in view of the above drawbacks, and it is an object of the invention to provide an improved apparatus whose operation can be stopped immediately, even if the controller of a separately excited charging circuit of a flash apparatus fails to operate normally.

In one aspect, the present invention relates to an apparatus comprising a CPU which receives clock signals from at least two oscillators including a first oscillator and a second oscillator; a flash control circuit of a separately excited oscillating type which is controlled by signals from the CPU; a switching device that repeatedly switches between ON and OFF states in accordance with switching signals from the CPU; a transformer working in accordance with the ON/OFF state of the switching device; a main capacitor charged by the output of the transformer; a first timer working in accordance with a clock signal from the first oscillator; a second timer working in accordance with a clock signal from the second oscillator; and a protection circuit that switches the switching device to the OFF state in accordance with a timer signal output of any one of the first and second timers, independently of the switching signals from the CPU.

In another aspect, the present invention relates to an apparatus comprising a clock circuit for supplying a first clock signal having a frequency capable of driving a CPU in a first mode, and a second clock signal capable of driving the CPU in a second mode at a frequency lower than that of the first clock signal; a flash control circuit of a separately excited oscillating type controlled by control signals from the CPU; a switching device that repeatedly switches between ON and OFF states in accordance with switching signals from the CPU; a transformer working in accordance with the ON/OFF state of the switching device; a main capacitor charged by the output of the transformer; a first timer working in accordance with a first clock signal; a second timer working in accordance with a second clock signal; and a protection circuit that switches the switching device to the OFF state in accordance with a timer signal output of any one of the first and second timers, independently of the switching signals from the CPU.

Further objects, features and advantages of the present invention will become apparent from the following description of the preferred embodiments with reference to the attached drawings.

DESCRIPTION OF THE PREFERRED EMBODIMENTS

Figure 1:
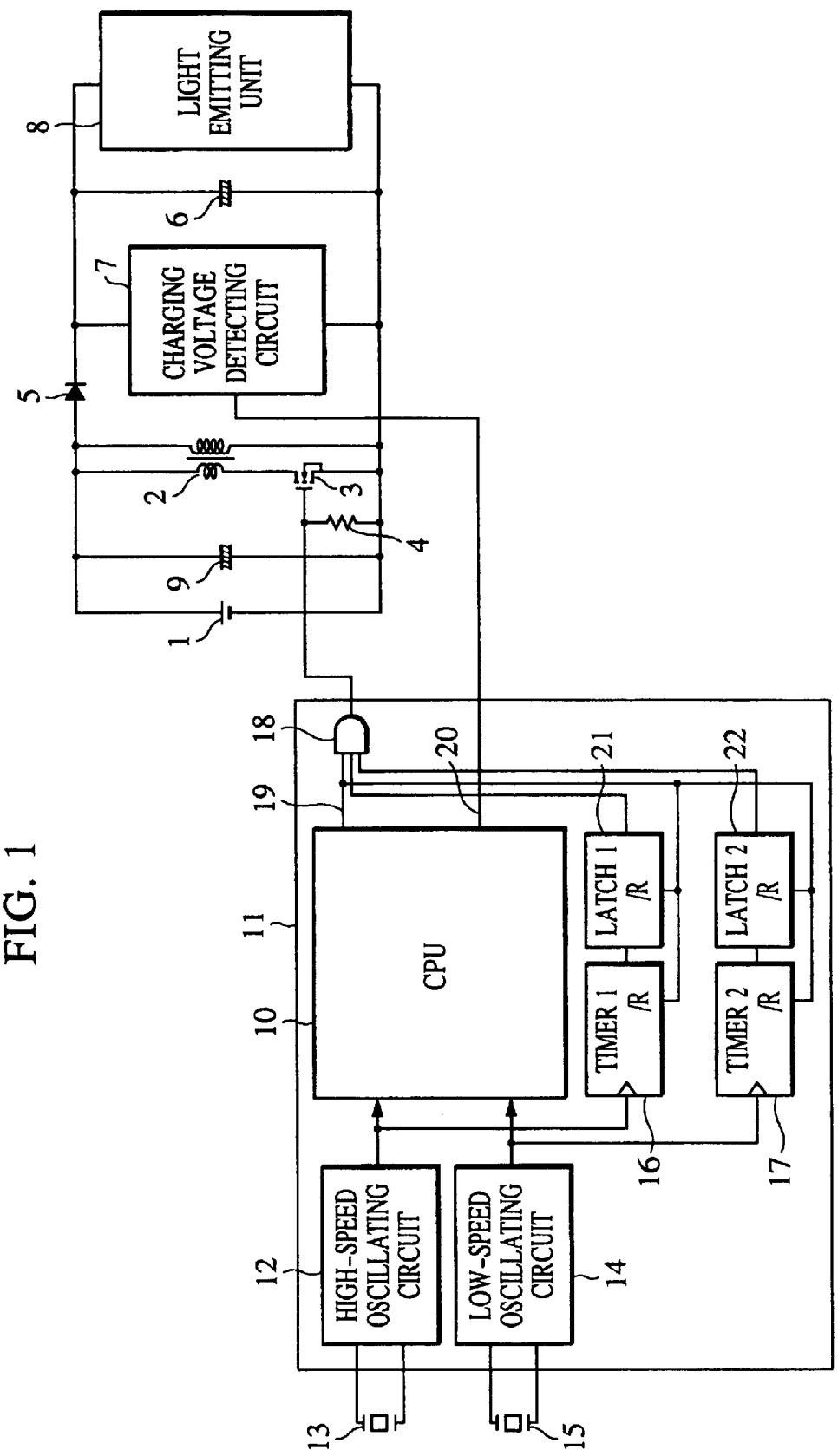
FIG. 1 is a block diagram showing a camera flash charging circuit according to the present invention.
Figure 2:
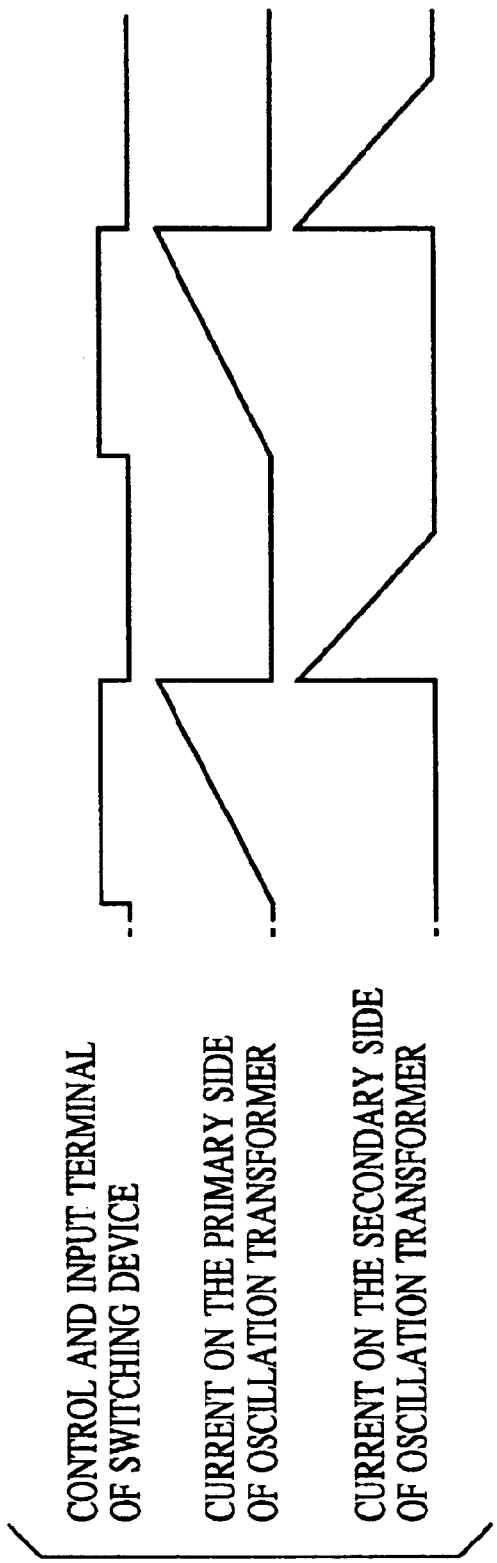
FIG. 2 is a waveform graph schematically showing the operation of a conventional flash charging circuit.
Figure 5:
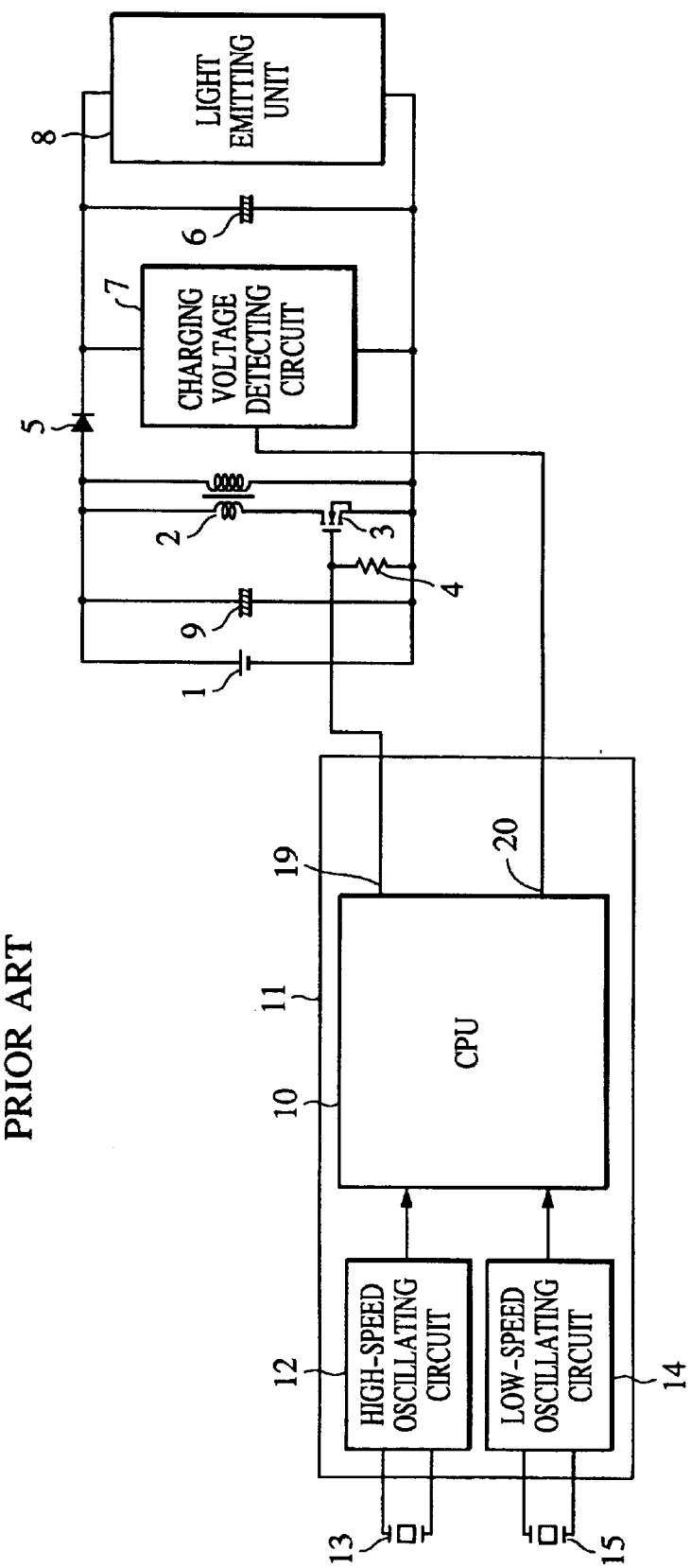
FIG. 5 is a block diagram showing a conventional camera flash charging circuit.

FIG. 1 is a drawing showing an embodiment of the present invention. In this drawing, functional elements which are the same as those used in the aforementioned conventional circuit in FIG. 5 are represented by the same reference numerals.

At first, a description will be given to explain the flash charging circuit of the present invention. In FIG. 1, reference numeral 1 represents a battery serving as an electrical power supply, reference numeral 2 represents an oscillation transformer for boosting a flyback pulse generated in its primary coil and outputting the same to its secondary coil, reference numeral 3 represents a switching device for controlling the current flowing through the primary coil of the transformer 2, and reference numeral 4 represents a resistor connected between a control electrode of the switching device 3 and GND, which resistor is provided for preventing a malfunction when no signal is fed to the switching device. Reference numeral 5 represents a diode for use in current rectification, connected in a manner such that it can rectify the output of the secondary coil of the oscillation transformer 2. Reference numeral 6 represents a main capacitor, reference numeral 7 represents a voltage detecting circuit for detecting the charge/voltage level across the capacitor 6 and for outputting the detection result to a controller (e.g., CPU 10), reference numeral 8 represents a light emitting unit consisting of an electric discharge tube and a trigger circuit for triggering a light emission from the discharge tube, and reference numeral 9 represents a power supply capacitor connected in parallel with the battery 1.

Next, a description will be given to explain a control circuit for controlling various functional portions, including a flash charging circuit, in a camera.

Reference numeral 11 represents a main IC (control circuit) which is responsible for controlling the camera and which contains a CPU 10 for carrying out overall control. A high-speed oscillator 13 is connected to a high-speed oscillating circuit 12 provided within the main IC, while a low-speed oscillator 15 is connected to a low-speed oscillation circuit 14 also provided within the main IC. A clock signal output by the high-speed oscillating circuit provides an operation clock signal when the CPU 10 is operating normally, while a clock signal output by the low-speed oscillating circuit provides an operation clock signal when the CPU 10 is operating at low-speed, and also provides a clock signal source for time measurement. The main IC 11 further contains a timer unit 16 using the output of the high-speed oscillating circuit as its input, and another timer unit 17 using the output of the low-speed oscillating circuit as its input. Reset terminals of these timers are connected to the output port 19 of the CPU.

Reference numerals 21 and 22 are latches for detecting an H to L transition of the outputs of the timer units 16 and 17, and are reset by the output port 19 of the CPU.

Furthermore, the main IC 11 contains a 3-input AND gate 18 which is connected on its input side to the output port 19 of the CPU and also to the outputs of the latches 21 and 22. The output of the AND gate is connected to the control terminal of the switching device 3. As described in greater detail below, latches 21 and 22 and AND gate 18 function as a protection circuit for the flash control circuit.

The main IC 11 receives the output from the voltage detecting circuit 7 of the flash charging circuit; this output is connected to the input port 20 of the CPU contained in the main IC.

Figure 3:
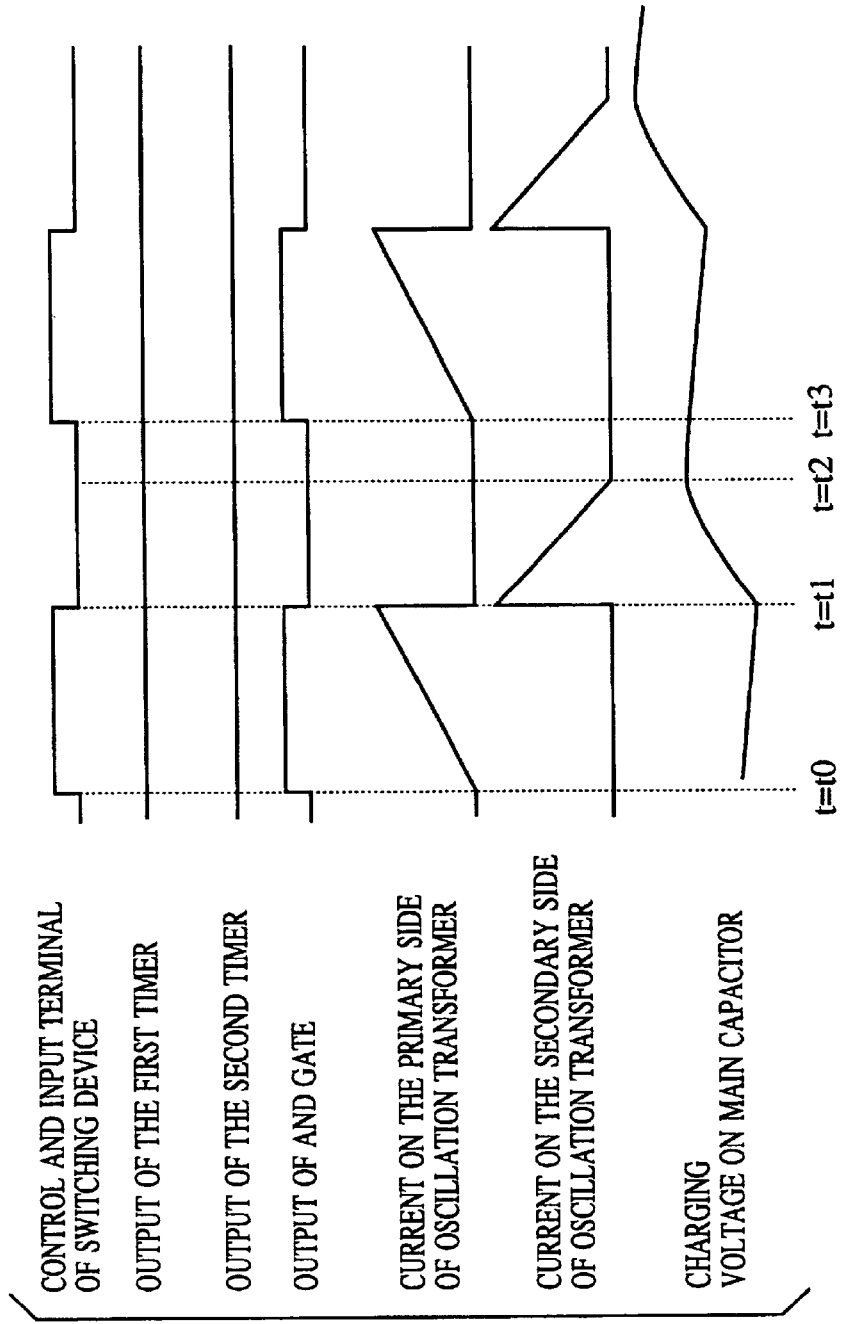
FIG. 3 is a waveform graph schematically showing a normal operation of a camera flash charging circuit according to the present invention.

Next, a description will be given to explain the operation of the flash charging circuit formed in accordance with the present embodiment, with reference to FIG. 3.

As shown, the main IC 11 starts a boosting operation from the beginning of charging, by switching between H and L (high and low levels) at the output port 19 of the CPU 10 at predetermined intervals, thereby driving the control terminal of the switching device 3.

Here, the timer units 16 and 17 use, as respective inputs, the output of the high-speed oscillating circuit 12 and the output of the low-speed oscillating circuit 14. When a reset signal from the output port 19 of the CPU 10 connected with the reset terminals of the respective blocks changes from L to H, the reset is released and a counting operation is started. After the reset is released, the outputs of these timers are at the H level, so that the outputs of the latches 21 and 22 are also at their H levels. Upon reaching predetermined count values, the outputs of the respective timers will be at the L level. Meanwhile, the outputs of the latches 21 and 22 will also drop to the L level.

When t=t0, once the output port 19 of the CPU 10 is at its H level, the reset of the units 16 and 17 as well as the reset of the latches 21 and 22 are all released, so that each timer starts operating. Since the output of each timer and the output of each latch are at the H level until reaching predetermined values, and since the three inputs of the AND gate 18 are all at the H level, the AND output will also be at the H level. At this time, the control terminal of the switching device 3 will be set at the H level, thereby turning on the switching device 3.

In this way, once the switching device 3 is turned on, a current corresponding to the ON resistance of the switching device 3 and the DC resistance of the primary coil of the transformer 2 begins to flow gradually.

The count value of each of the timer units 16 and 17 is set in a manner such that the detecting time of each of the timer units 16 and 17 will be longer than a predetermined switching time t1. For this reason, since each of the timer units 16 and 17 will not reach its predetermined set time until the predetermined time t1 has passed, the output of each of the timer units 16 and 17 will stay at the H level. Accordingly, after the predetermined time t1 has passed and when the output port 19 of the CPU 10 is at the L level, the output of the AND gate 18 will also be at the L level, so that the control terminal of the switching device 3 will also be at the L level, hence turning off the switching device 3.

Meanwhile, the output of each timer block and the output of each latch are also reset.

At this time, a flyback pulse is generated in the secondary coil of the transformer 2, corresponding to the current flowing through the primary coil of the transformer 2. By rectifying the flyback pulse occurring in the secondary coil using the rectifying diode 5, a charging current will flow into the main capacitor 16, thereby increasing the charging voltage on the main capacitor 16. When t=t2, the secondary current stops.

When t=t3, the CPU 10 again sets its output port 19 to the H level, thereby repeating the charging operation.

The CPU 10 detects a charging voltage on the main capacitor 16 by virtue of the voltage detecting circuit 7. Such detection is repeated until the output of the voltage detecting circuit 7 arrives at a predetermined value.

Here, the time period lasting from t=t1 to t=t2 varies depending on the charging voltage, the battery voltage, and the like. However, it is possible to ensure a highly efficient charging operation by controlling the time period lasting from t=t2 to t=t3 so that this time period will become shorter.

Figure 4:
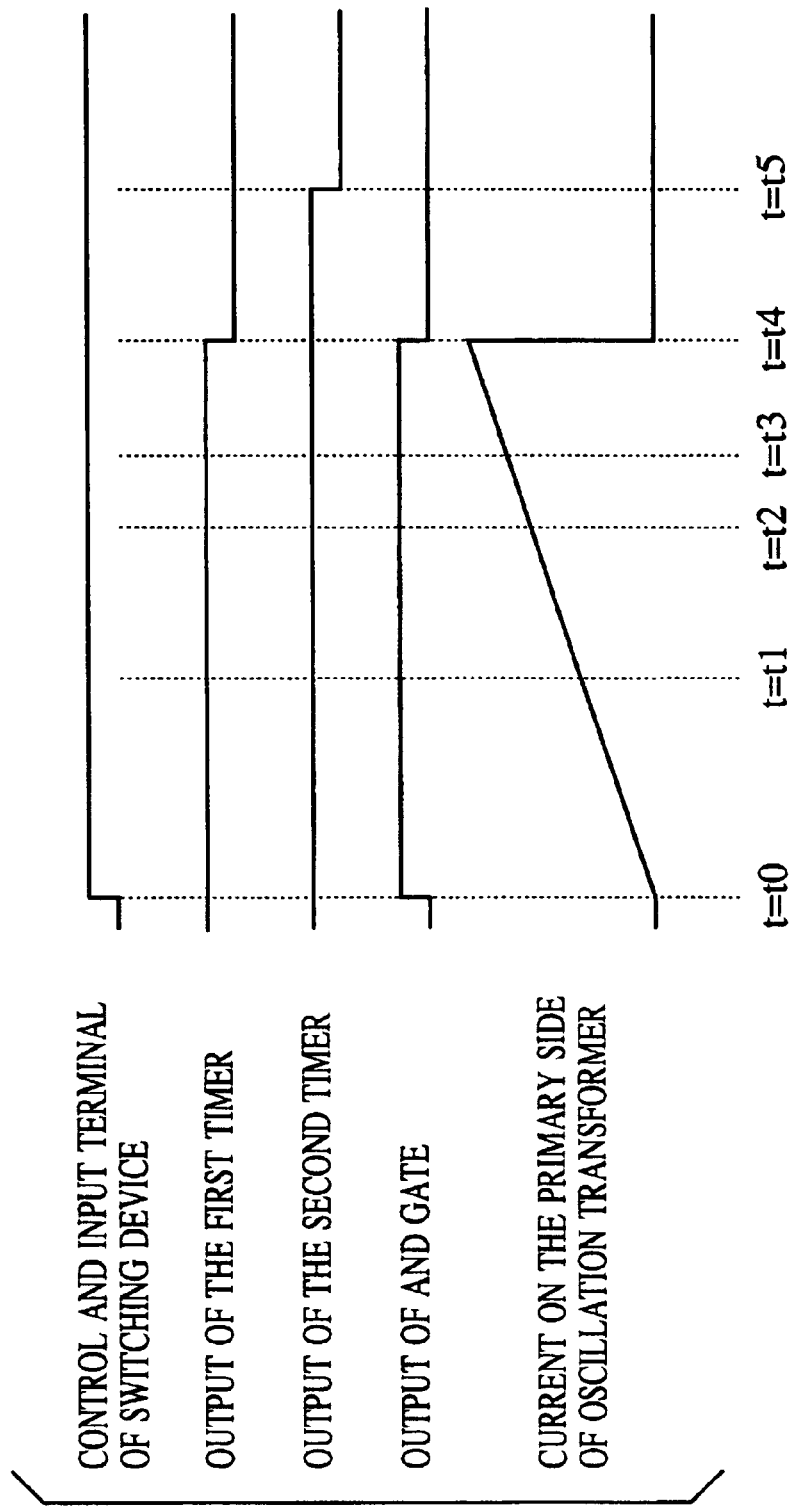
FIG. 4 is a waveform graph schematically showing an abnormal operation of a camera flash charging circuit according to the present invention.

FIG. 4 is a graph showing a system fault or failure in which the CPU 10 itself is out of control due to external noise such as static electricity during the charging operation.

If the CPU 10 stops operating at time t=t0 while the output port 19 is maintained at the H level, since the output of the AND gate 18 will also be at the H level, the switching device 3 will be kept in its ON state, which is undesirable.

At this time, an excessively large current will continue to flow in the primary coil of the transformer 2, as well as in the switching device 3. As a result, the primary coil of the transformer 2 and the switching device 3 will be excessively heated, bringing about possible damage to these elements.

When the output port 19 of the CPU 10 is at the H level and remains at such an H level (without changing back to the L level even if an inversion time t1 has passed), since the timer units 16 and 17 are not reset, the count values set therein will continue to count. At this time, any one of the timers will operate, thus increasing the value set therein. Upon counting up, each timer inverts its output and provides an L level output.

For example, as shown in FIG. 4, it is assumed that the timer unit 16 inverts its output at time t=t4 and the timer unit 17 inverts its output at time t=t5.

Then, the above outputs are received by any one of the latches 21 and 22, and used as L level outputs.

In this way, when the output of any one of the latches is inverted, the output of the AND gate 18 will be inverted at time t=t4 to be at the L level. At this time, the control terminal of the switching device 3 is set to be L level, thereby turning off the switching device 3.

Since the output of each of the latches is not reset except when the output port again changes to the L level, it is impossible for the output of the AND gate 18 to again change to the H level.

On the other hand, even if the output port 19 of the CPU is continuously kept at the H level, when the output of any one of the timers 16 and 17 has been inverted, the output of the AND gate will be at the L level. Accordingly, provided that any one of the timers is operating normally, it is possible to turn off the switching device 3.

In the present embodiment, since the timers are prepared independently from each other for the high-speed oscillator and the low-speed oscillator, normal operations of the various functions discussed above can be ensured, thus providing an effective safety measure for the flash charging circuit, except when both the high-speed oscillator and the low-speed oscillator stop oscillating due to an unexpected system failure or fault.

Furthermore, with regard to the system using only a single CPU, since it is possible to ensure high reliability and safety, it is no longer necessary to provide a second CPU only for use in flash control, thereby allowing the circuit scale to be reduced, thereby reducing production costs.

On the other hand, even in the case where a wire break (disconnection) occurs between the output of the AND gate 18 and the control terminal of the switching device 3, since the control electrode can be kept at the L level due to the pull-down resistor 4 connected between the control electrode of the switching device 3 and ground, the switching device 3 will not be inadvertently turned on by accident.

On the other hand, if the charging voltage detecting circuit 7 has not been correctly connected to the input port 20 of the CPU 10, it is impossible to confirm whether or not a charging operation has been completed. At this time, it is possible to provide a function which enables the CPU 10 to internally measure a time period from the start of the charging process, and to stop the charging process if the output of the charging voltage detecting circuit 7 is not inverted by the time a predetermined time has passed.

In one embodiment, the clock time of the first timer may be identical to that of the second timer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electrical flash control apparatus comprising:
   a main capacitor that stores a charge for exciting a flash tube;
   a switching device having an ON state and an OFF state;
   a transformer, connected to said switching device, that generates a charging current for charging said main capacitor;
   at least two oscillators, including a first oscillator that outputs a first clock signal and a second oscillator that outputs a second clock signal;
   a CPU that receives at least one of the first clock signal from said first oscillator and the second clock signal from said second oscillator, outputs a switching signal to said switching device that repeatedly switches said switching device between the ON state and the OFF state;
   a first timer that receives the clock signal from the first oscillator and outputs a first timer signal;
   a second timer that receives the clock signal from the second oscillator and outputs a second timer signal; and
   a protection circuit that switches said switching device to the OFF state in response to either the first timer signal or the second timer signal, independently of the switching signal from said CPU.

2. A strobe control apparatus according to claim 1, wherein when said switching device is performing its ON/OFF switching operation in accordance with the switching signals from said CPU, and when the switching device has been switched to the ON state for a time period equal to or longer than a predetermined time period after said switching device was changed-over from the OFF state to the ON state, said protection circuit switches said switching device to the OFF state in accordance with the first timer signal or the second timer signal.

3. An apparatus according to claim 1, wherein the first oscillator is a high-speed driving oscillator that supplies a first clock signal having a first frequency capable of driving the CPU in a first mode, and the second oscillator is a low-speed driving oscillator that supplies a second clock signal having a second frequency, lower than the first frequency, capable of driving the CPU in a second mode.

4. An electrical flash control apparatus comprising:
   a main capacitor that stores a charge for exciting a flash tube;
   a switching device having an ON state and an OFF state;
   a transformer, connected to said switching device, that generates a charging current for charging said main capacitor;
   a CPU that outputs a switch signal to said switching device that repeatedly switches said switching device between the ON state and the OFF state;
   a clock circuit that supplies to the CPU a first clock signal having a first frequency capable of driving the CPU in a first mode, and a second clock signal having a second frequency, lower than the first frequency, and capable of driving the CPU in a second mode;
   a first timer that receives the first clock signal from the clock circuit and outputs a first timer signal;
   a second timer that receives the second clock signal from the clock circuit and outputs a second timer signal; and
   a protection circuit that switches said switching device to the OFF state in response to either the first timer signal or the second timer signal, independently of the switching signal from said CPU.

5. A strobe control apparatus according to claim 4, wherein when said switching device is performing an ON/OFF switching operation in accordance with the switching signals from said CPU, and when said switching device has been switched to the ON state for a time period equal to or longer than a predetermined time period after said switching device was changed-over from the OFF state to the ON state, said protection circuit switches said switching device to the OFF state in accordance with the first timer signal or the second timer signal.

* * * * *

UNITED STATES PATENT AND TRADEMARK OFFICE
CERTIFICATE OF CORRECTION

PATENT NO.   : 6,735,386 B2
DATED        : May 11, 2004
INVENTOR(S)  : Kazunari Kitani It is certified that error appears in the above-identified patent and that said Letters Patent is hereby corrected as shown below:

<u>Title page,</u>
Item [57], ABSTRACT,
Line 18, "timber" should read -- timer --.

<u>Column 2,</u>
Line 4, "intervals" should read -- intervals, --.

<u>Column 8,</u>
Lines 1 and 41, "strobe" should read -- flash --.

Signed and Sealed this

Twenty-third Day of November, 2004

JON W. DUDAS
*Director of the United States Patent and Trademark Office*